United States Patent [19]

Miller, Jr.

[11] 4,373,840
[45] Feb. 15, 1983

[54] PALLET TRANSFER SYSTEM

[75] Inventor: Leonard A. Miller, Jr., Fond du Lac, Wis.

[73] Assignee: Giddings & Lewis, Inc., Fond du Lac, Wis.

[21] Appl. No.: 135,037

[22] Filed: Mar. 28, 1980

[51] Int. Cl.³ .............................................. B23Q 7/02
[52] U.S. Cl. ................................ 414/225; 414/744 A;
414/751; 414/786; 198/339; 198/472; 269/57
[58] Field of Search ........................ 29/568; 269/56–58;
414/744 R, 744 A, 741, 749–751, 753, 222, 225, 786; 198/339, 472; 104/88

[56] References Cited

U.S. PATENT DOCUMENTS

| | | | |
|---|---|---|---|
| 3,630,391 | 12/1971 | Wilson | 414/744 A |
| 3,796,163 | 3/1974 | Meyer et al. | 104/88 |
| 3,825,245 | 7/1974 | Osburn et al. | 198/472 X |
| 3,874,525 | 4/1975 | Hassan et al. | 414/225 |
| 3,986,617 | 10/1976 | Blomquist | 198/339 X |
| 4,017,703 | 4/1977 | Lavins, Jr. et al. | 269/57 X |
| 4,027,767 | 6/1977 | Gluck | 198/339 |
| 4,185,376 | 1/1980 | Johnstone | 29/568 |
| 4,254,545 | 3/1981 | Higgins | 269/57 X |

*Primary Examiner*—Trygve M. Blix
*Assistant Examiner*—Terrance L. Siemens

*Attorney, Agent, or Firm*—Trexler, Bushnell & Wolters, Ltd.

[57] ABSTRACT

A workpiece handling system is disclosed. The system includes a generally centralized pallet handling stand, and a number of pallet-accepting stations. These stations can be associated with machine tools such as vertical turret lathes or horizontal boring machines or other machine tools. The station can also be a relatively simple pallet storage station. Alternatively, the station can comprise a cart upon which a pallet can be deposited for movement to other parts of the factory. The pallet transfer station includes a foundation, and a base rotatable upon the foundation. A ram is translatably slidable on the rotatable base. A latch is reciprocable upon the ram. To transfer a pallet from one station to another, the base is angularly indexed into general alignment with the first work station. A shot pin device effects final, precise alignment of the ram with the work station. The ram is then radially advanced into engagement with the work station. A Vee-shaped member effects alignment of the work station with the ram. The latch is then advanced to the work station, and engages the pallet. The latch then draws the pallet over a safety latch and into a relatively centralized position on the ram. The ram is then withdrawn to a relatively centralized position on the base. The base can then be angularly indexed into general alignment with the other work stations.

45 Claims, 16 Drawing Figures

PALLET TRANSFER SYSTEM

BACKGROUND OF THE INVENTION

This invention relates generally to machine tools, and more particularly concerns a pallet and workpiece handling system for quickly and efficiently moving workpieces to and from a machine tool.

In modern industry, the high cost of complex machine tools and the expense of labor require that the machine tools and the labor force be utilized as efficiently as possible. One known way to provide this efficiency is to secure workpieces to movable pallets, and to then transfer the pallet and workpiece combination to and from a work-performing station at the machine tool. By quickly and accurately locating the pallet with respect to the machine tool work-performing station, the workpiece is correspondingly located. The machine tool can then quickly and accurately perform its cycle of operations on the workpiece. Meanwhile, another pallet and workpiece can be set up and readied for movement to the machine tool work-performing station. In this way, the machine tool can perform machining operations during most of its operating time. Machine operations are not interrupted or delayed by workpiece set-up and transfer tasks being performed directly at the machine tool work station.

To implement some aspects of this concept, a number of pallet and workpiece handling systems have been previously offered. In general, however, these pallet handling systems have been associated with but a single machine tool. Moreover, the design of these systems does not permit workpiece pallets to be expeditiously transferred to other machine tools.

Other transfer systems provide extensive cart and track arrays for carrying pallets and mounted workpieces between widely separated machine tools. However, these systems still require manual or intricate machine-assist efforts to transfer the pallets and associated workpieces between the carts and the adjacent machine tools.

It is accordingly the general object of the present invention to provide a pallet and workpiece handling system which will permit a number of pallets, loaded with workpieces, to be transferred between a number of machine tools in a quick, efficient, and inexpensive manner.

An associated object is to provide such a workpiece handling system which will permit pallets and associated workpieces to be transferred to and from machine tools on the one hand, and to and from pallet-carrying carts on another hand so that workpieces may be quickly and efficiently moved between a group of machine tools and any other point in a factory area.

Another object is to provide such a workpiece handling system which can be operated by a single worker who can closely supervise pallet transferring operations in a safe and efficient manner.

Yet another object is to provide a workpiece handling system utilizing transferrable workpiece-carrying pallets which has a high degree of design flexibility, so that the system can move pallets to and from various machine tools and, if necessary, transfer carts, although the machine tools and carts are located in any of a variety of positions relative to one another. A related object is to provide such a system which uses a centralized pallet receiving and delivering stand mechanism having an extended "reach" or range of operative motion.

Still another object of the invention is to provide such a pallet and workpiece transferring system in which the transfer system and the associated machine tool tables can be quickly and accurately aligned with one another to provide easy, trouble-free pallet transfer action.

Other objects and advantages of the invention will become apparent upon reading the following detailed description and upon reference to the drawings. Throughout the drawings, like reference numerals refer to like parts.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Figure 1:
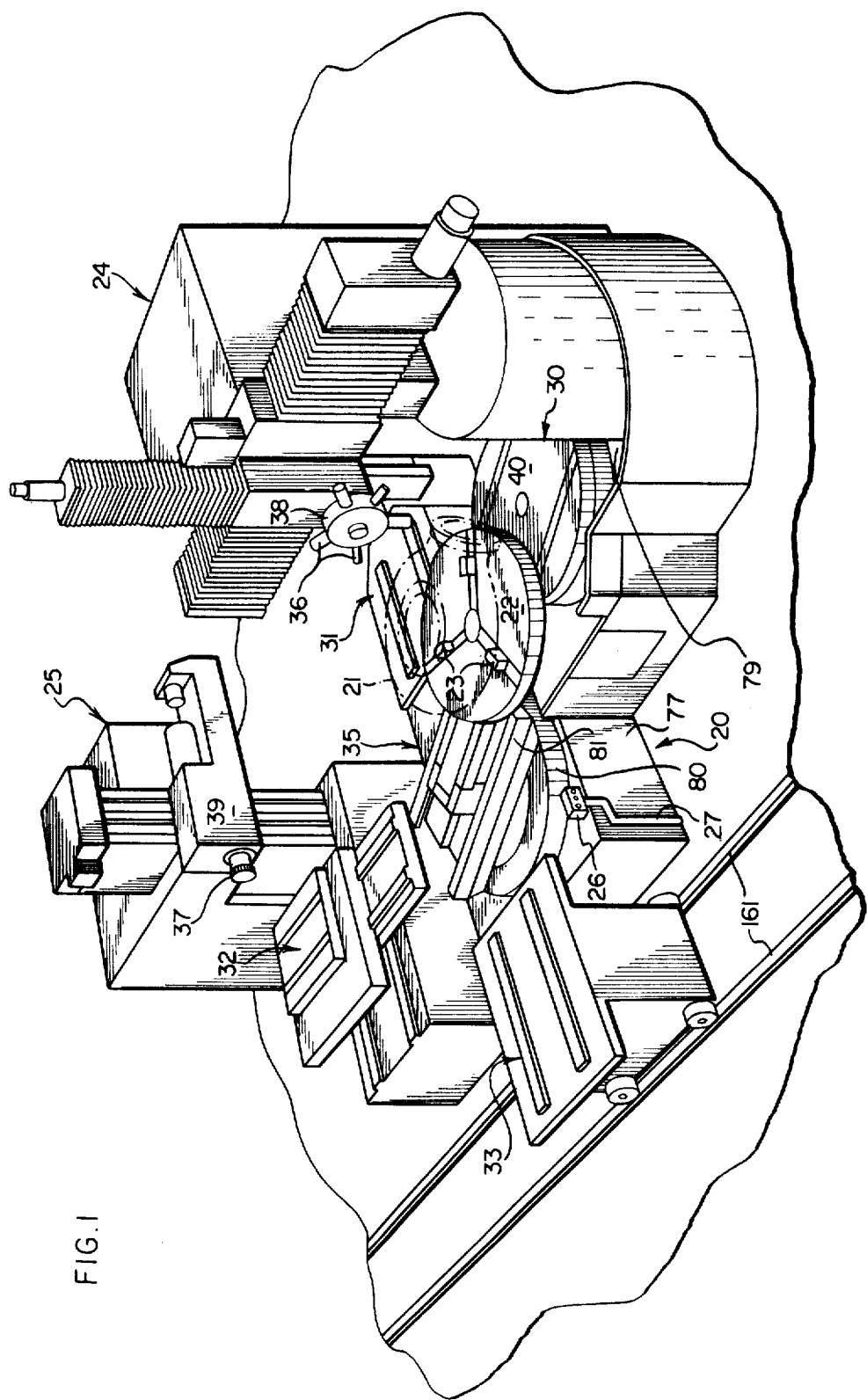
FIG. 1 is a perspective view showing the novel pallet and workpiece transfer system as it can appear when it is used with various machine tools, temporary storage stations, and workpiece transferring carts, some of the machine tool chip shields being omitted for clarity.
Figure 2:
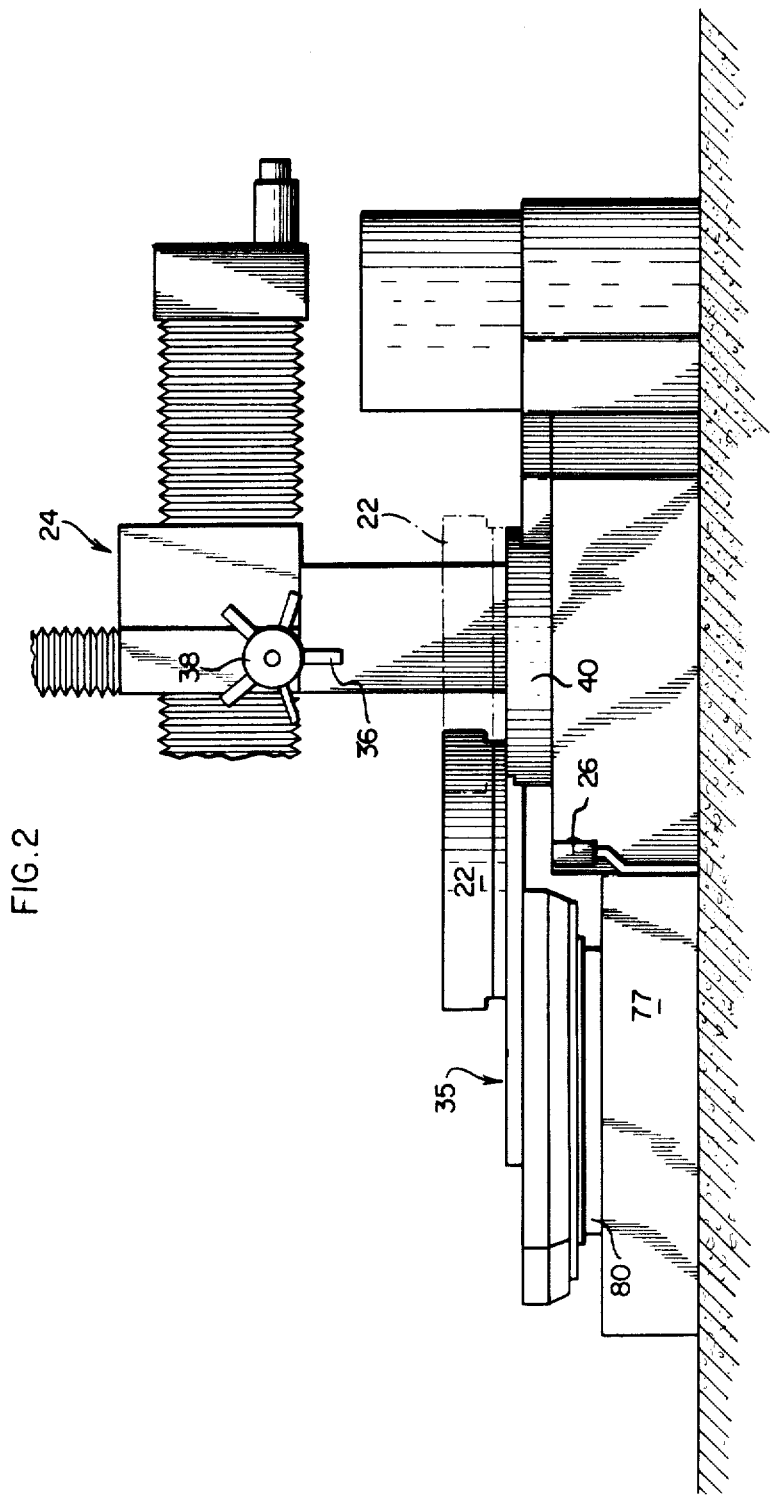
FIG. 2 is a partial side elevational view of the pallet and workpiece transfer system and associated machine tool shown in FIG. 1.

Turning first to FIG. 1 there is shown an embodiment of a novel system 20 for handling a typical workpiece 21 which is mounted on a pallet 22. The workpiece 21 is rigidly secured to the pallet 22 by pallet-carried chuck mechanisms 23 or other known means.

In accordance with a broad aspect of the invention, this system 20 can be used to move the workpieces 21 between individual machine tools. Here, for example, a vertical turret lathe 24 is associated with a horizontal boring machine 25 to perform various machining operations on desired surfaces of the workpiece 21. This vertical turret lathe 24 can be of the type offered by Giddings & Lewis Machine Tool Company of Fond du Lac, Wisconsin, and can have a work table of up to 84 inches in diameter. The horizontal boring machine 25 can also be of the type offered by Giddings & Lewis Machine Tool Company. It will be understood that machine tools of other types, or machine tools offered by other manufacturers, can be used and associated with the novel workpiece handling system 20 if desired. These machine tools 24 and 25 can be numerically controlled, as by programmable computers (not shown) or other known means. When they are so controlled, each machine tool 24 and 25 can automatically perform a series of operations on the workpiece 21.

Conveniently located near the system 20 is a control panel 26, here mounted upon a post 27. This control panel 26 provides a number of actuators for operating the system to transfer the workpieces 21 between the various work stations, storage stations and carts. This control panel requires a system operator to be located near the control panel 26, where he can observe the system 20 and the related machine tools 24 and 25 and so insure safe and efficient system operation.

In accordance with the broad aspect of the invention, a number of stations 30, 31, 32 and 33 are provided, each of which can be reached by a centralized pallet stand 35. Some of these work stations—here, the stations 30 and 32—are associated with the machine tools 24 and 25. When a workpiece 21 is located at a work station 30 or 32, various cutting tool bits 36, 37 can be brought into engagement with the workpiece 21 by heads 38, 39 so as to form the desired surfaces. The movement and operation of the tool heads 38 and 39 can be controlled by computers, in known manner.

MACHINE TOOL TABLES AND WORK STATIONS

Figure 3:
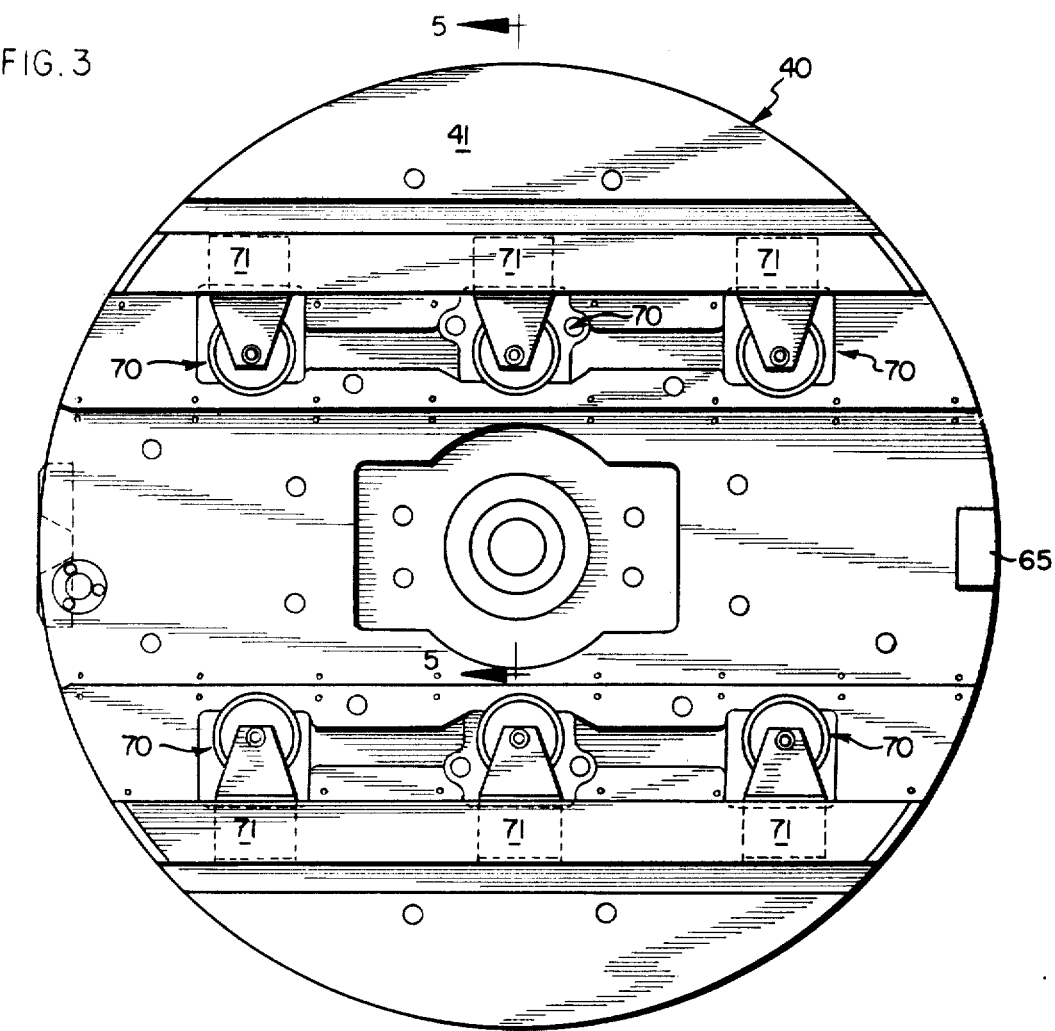
FIG. 3 is a top plan view of a machine tool work table adapted to receive a pallet from the novel pallet transfer system.

As explained above, it is an object of this system 20 to rapidly and efficiently move a workpiece 21 to a station 30-33 and to rapidly and efficiently withdraw that workpiece 21 from the station 30-33 when desired. Here, to efficiently and accurately manipulate the workpiece 21 when it is located at a work station 30 of the vertical turret lathe 24, the work station 30 includes a rotatable turntable 40. As shown especially in FIGS. 3-5, this turntable 40 can be accurately angularly indexed, and it is provided with devices for firmly and accurately locating and clamping the pallet 22 upon a top 41 of the turntable 40.

Figure 5:
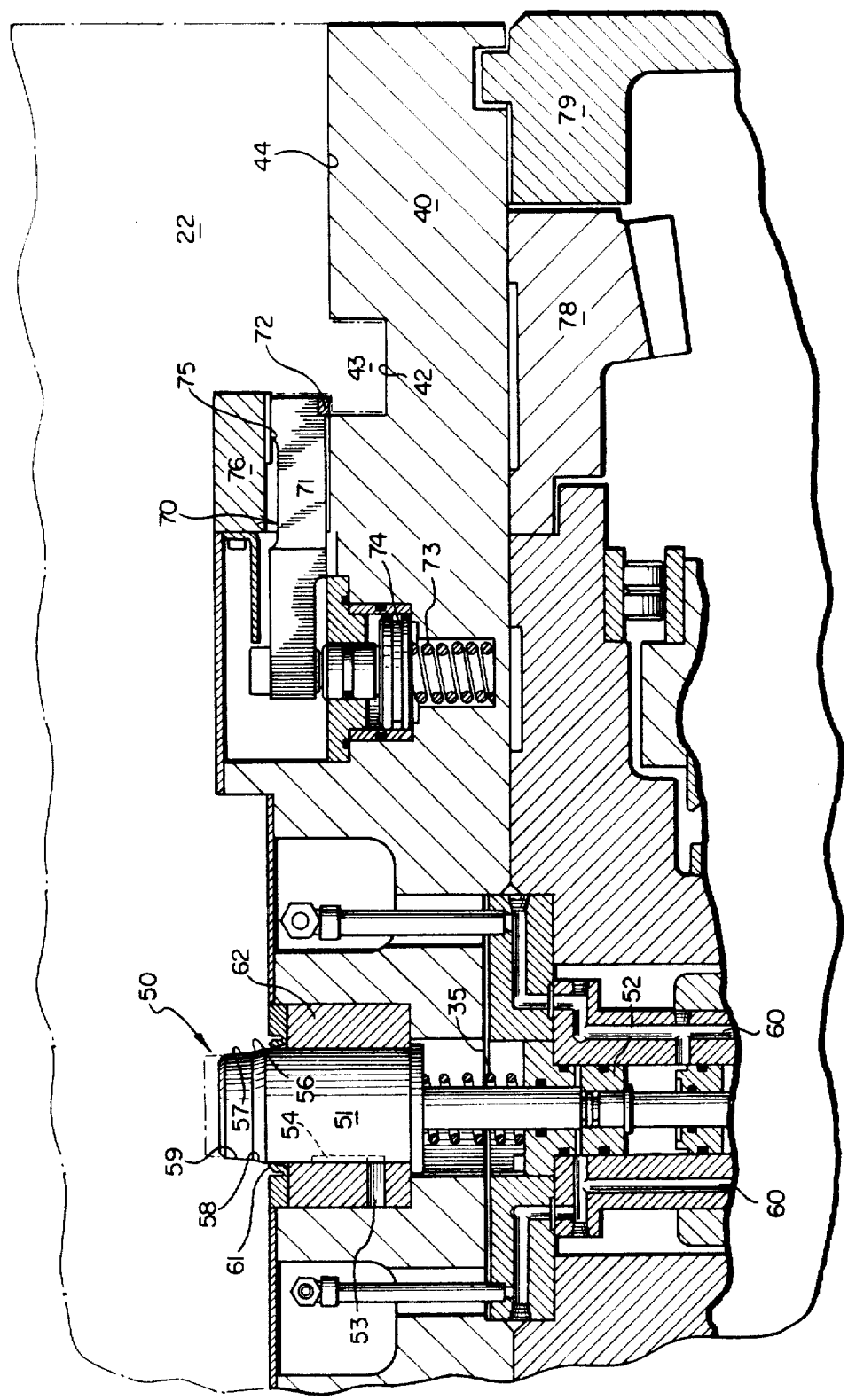
FIG. 5 is a sectional view of a machine tool work table and associated pallet taken substantially in the plane of line 5—5 in FIG. 3.

As shown in FIG. 5, the turntable 40 is provided with a pair of elongated recesses or slots 42. These turntable recesses 42 mate with rails 43 formed upon or bolted to an underside 44 of the pallet 22. Thus, when the turntable recesses 42 are aligned with the pallet rails 43, the pallet 22 can be slipped on or off the table 40, as can be envisioned from FIGS. 1 and 13-16.

It is important that the pallet 22 be accurately locked in a predetermined position atop the turntable 40 so that the carried workpiece 21 can be properly engaged by the tools 36. To this end, a shot pin mechanism 50 is provided to extend upwardly through and retract downwardly into the center of the turntable 40 as seen in FIG. 5. This shot pin mechanism 50 here includes a shot pin member 51 which can be forced upwardly by a hydraulic piston 52. A key 53 prevents rotation of the shot pin member 51 by engaging a slot 54 formed in the pin side. A compression spring 55 urges the shot pin member 51 into an upwardly extending position even if hydraulic pressure is, for some reason, lost. As an additional safety feature to prevent loss of the pallet as the work table 40 rotates during machining operations, a positive stop 65 and an automatic latch 139 are mounted to the turn table, as explained below.

The shot pin member 51 is provided with a series of conically beveled edges 56, 57 which are formed to mate with complementary surfaces 58, 59 formed in the center of the pallet 22. By forming these surfaces 56-59 so as to be slightly conical in their configuration, extremely accurate positioning of the pallet 22 over the turntable 40 can be accomplished. Hydraulic power is supplied to the shot pin mechanism 50 through lines 60. If desired, a seal member 61 can be provided to exclude dirt or other corruption from the interior of a mount 62 which carries the shot pin member 51 for its reciprocable motion.

In operation, the pallet member 22 is moved over the turntable 40 in a manner described below. When the pallet 22 has been roughly centered on the turntable 40, fluid pressure is delivered through the lines 60 so as to extend the shot pin 51 upwardly and engage the mating pallet surfaces 58, 59, thereby centering the pallet 22 over the turntable 40.

It is also important that the pallet 22 be firmly clamped or otherwise secured to the turntable 40 once it has been accurately positioned, in order that the workpiece 21 will not shift about when it is being machined or worked on. To this end, a series of clamps 70 are provided with levers 71 which extend over the recesses or grooves 42 formed in the turntable 40, as shown in FIG. 5. These levers 71 engage the rails 43 affixed to the underside 44 of the pallet 22 and firmly hold the pallet 22 in the position to which it has been accurately indexed by the shot pin mechanism 50. To inhibit lever wear, the lever tips can be provided with a hardened tool steel insert 72.

These clamping mechanisms 70 can be operated by an appropriate actuator on the control panel 26. When the actuator is operated, hydraulic fluid is supplied to a cylinder 73 so as to force upwardly a piston 74. This piston 74 motion causes the lever 71 to pivot about a point 75 defined by a fulcrum rail 76 bolted or otherwise secured to the turntable 40. In this way, a powerful clamping action is applied to the pallet rails 43 and they are firmly seated in the recesses 42 formed in the turntable 40. When clamping has been accomplished, the machine table 40, the pallet 22 and the workpiece 21 can be rotated as a unit by a ring gear 78 driven by a pinion (not shown) in the machine tool base 79 for quick, accurate machining operations. It will be understood that generally similar positioning and clamping mechanisms can be provided to secure the pallet 22 at another work station 32 associated with the horizontal boring machine 25.

THE PALLET STAND

To move the pallets 22 and associated workpieces 21 about in accordance with the general aspect of the invention, the system 20 provides a centralized pallet stand 35. As shown in FIGS. 1, 2 and 6–9, this pallet stand 35 includes a stationary base or foundation 77, rotatable slideways base 80, and a slideways ram 81 carried for reciprocation on the slideways base 80. As seen in FIGS. 6–9, a reciprocable latch 85 is, in turn, carried on the ram 81 for engaging a pallet 22 and drawing the pallet over the ram or, alternatively, pushing the pallet 22 off the ram 81. Thus a double slide arrangement is provided, i.e., the ram 81 slides relative to the rotatable slideways base 80, and the latch 85 slides relative to the ram 81. This arrangement permits the pallet stand 35 to "reach" over extended distances to deliver and retrieve pallets, even though those pallets may be located at positions usually enclosed by machine tool chip shield slides or doors.

Figure 9:
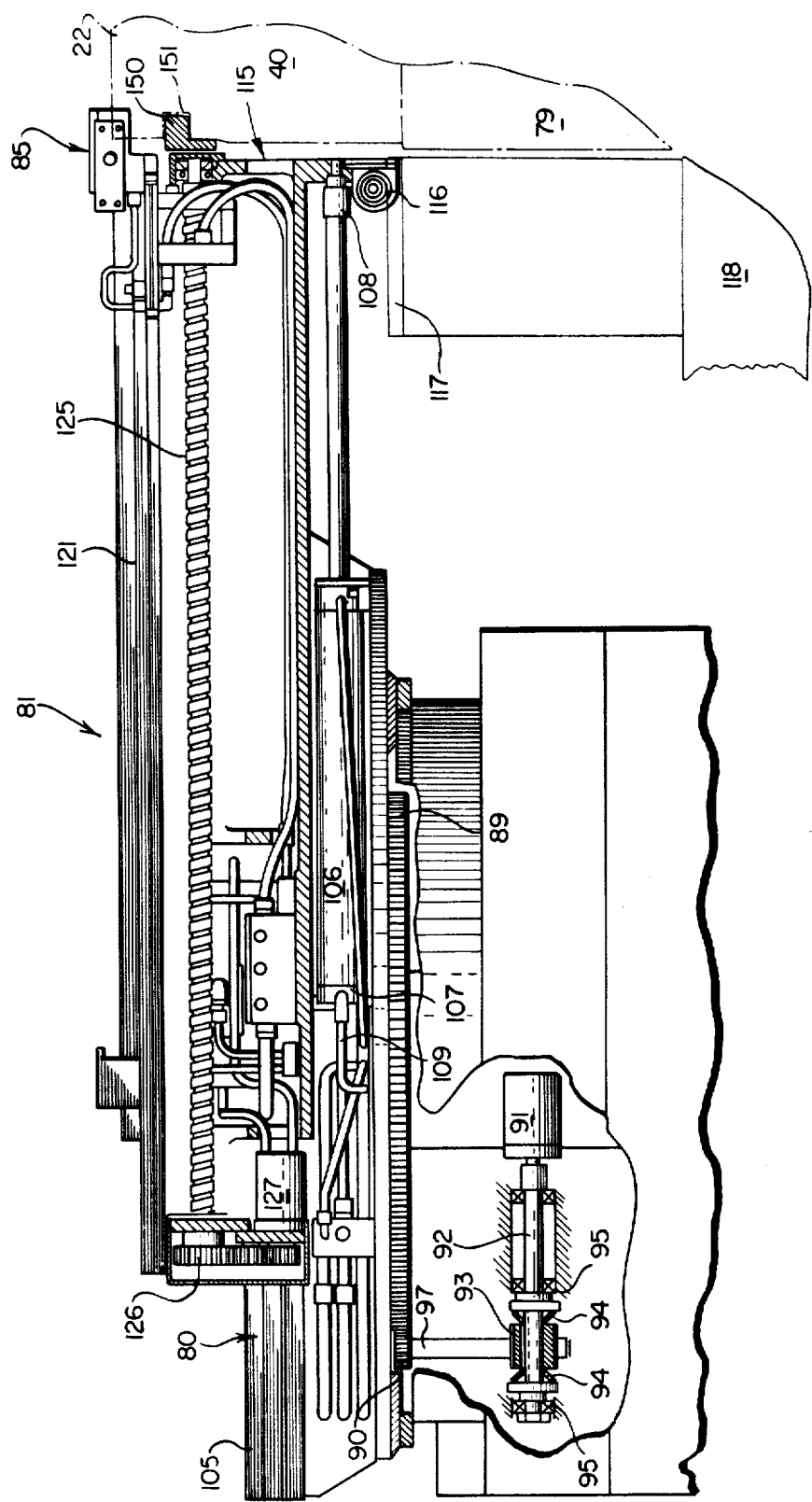
FIG. 9 is a side elevational view in partial section and showing the pallet transfer stand ram, latch and associated mechanisms shown in FIGS. 7 and 8.

More specifically, a ring gear 89 can be mounted upon the pallet stand slideways base 80, as shown in FIG. 9. That ring gear 89 can be rotatably driven by a pinion 90 operated by a hydraulic motor 91 or other convenient means. The motor 91 drives a shaft 92 upon which is carried a worm 93. Splines or other convenient arrangement permit the worm 93 to be rotated with the shaft 92, but to undergo limited axial motion relative to that shaft 92. Spring discs 94 of the Belleville washer type urge the worm 93 into a centered position between bearings 95. A mating worm gear (not shown) and vertical shaft 97 transfer motion from the motor 91 and shaft 92 to the rotator drive pinion 90.

As will be explained below, this drive arrangement provides desired rotational movement to the base 80 and the carried ram 81, but permits slight rotational adjustment of the ram 81 during final positioning for pallet transfer without straining or damaging the pivot drive parts. Slight rotational movement of the base 80 will be transmitted to the worm 93, and that motion can be absorbed or lost by a slight axial slipping motion of the worm 93 along the shaft 92 without damage to the motor 91 or other drive components. In this way, the ram 81 can be pivoted about to address any of the work stations 30–33. Again, this pivoting motion can be controlled by a known automatic control mechanism such as a resolver or any other known arrangement connected to the control panel 26. It will be understood that, by appropriately designing the pivoting structure, this pivoting motion can include substantially 360° of swivel. To avoid unnecessarily complicating hydraulic lines and other structure in the pallet stand 35, it has been found desirable to limit that swivel motion to substantially one full revolution, or 357°.

To accurately angularly align the ram 81 with a work station 30–33 so as to transfer a pallet, a shot pintype mechanism 100 is provided, as shown in FIGS. 6, 7 and 13–16. As indicated particularly in FIG. 7, a Vee-shaped element 101 can be urged radially toward the rotatable base 80 to engage one of a series of mating Vee notches 102, 103 mounted on the base 80 at positions which cause the base 80 and ram 81 to be angularly aligned with a corresponding pallet transfer station. Thus, rapid ram rotation and preliminary angular alignment of the ram 81 are provided by the pallet stand rotator motor 91 and a controlling resolver mechanism, but final precise angular ram alignment is provided by the shot pin mechanism 100 and associated Vee notches 101, 102. Angular adjustment motion caused to the pallet stand base 80 by the shot pin mechanism 100 will be absorbed in the rotator drive as described above without damaging the rotator motor 91 or other drive components.

THE RAM

Figure 7:
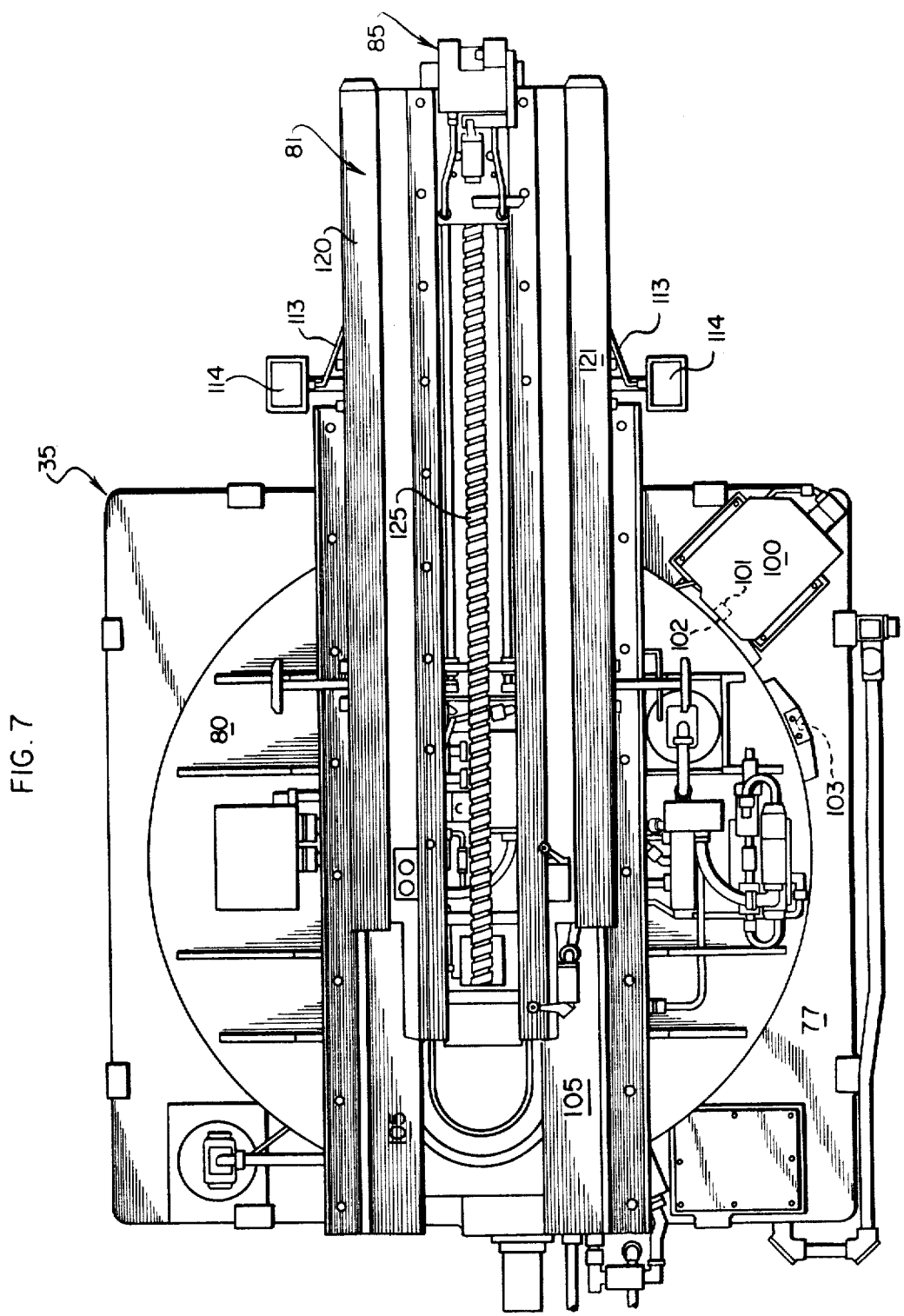
FIG. 7 is a top plan view of a system pallet stand having an extensible ram, a translatable latch and other mechanisms.

As can be seen in FIGS. 7 and 9, the slideways ram 81 is adapted to be translatably or reciprocably moved over ways 105 formed on the top of the rotatable base 80. The ram reciprocable motion can be conveniently caused by a hydraulic cylinder 106 having one end 107 mounted to the base 80, and a rod end 108 mounted to the ram 81. Hydraulic power for this cylinder 106 can be provided through appropriate hydraulic conduits 109.

Figure 8:
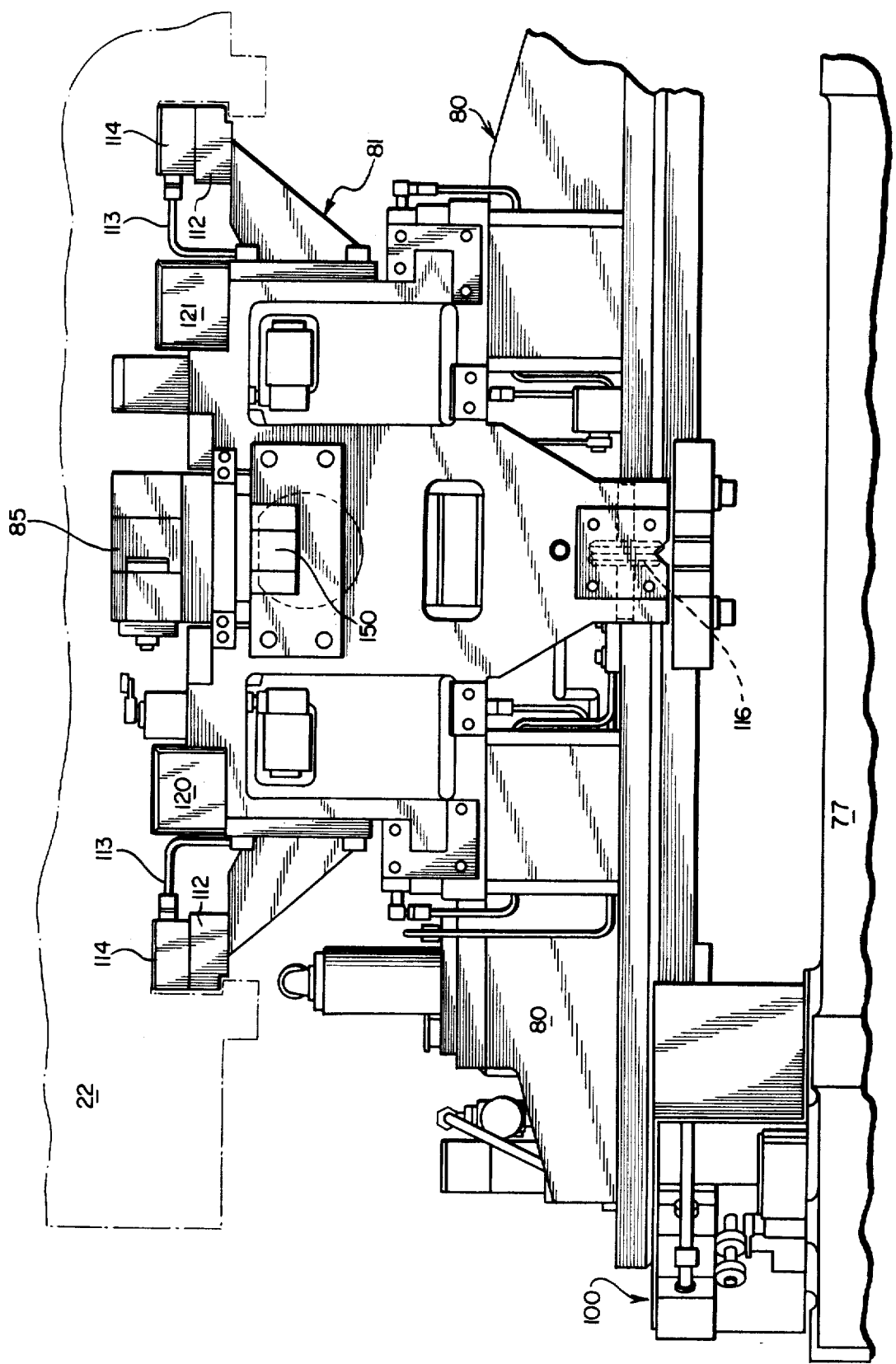
FIG. 8 is a fragmentary end elevational view of the slideways ram and associated mechanism shown in FIG. 7.

To prevent pallets from being tipped over or dislodged from the ram 81, wing way members 112 can be provided, if desired, at positions outboard of the ram 81, as shown particularly in FIGS. 7 and 8. These wing members 112 can be provided with lubrication fluid through lines 113 and fittings 114 so as to provide easier pallet sliding motion over the table 40.

To provide additional bearing support to a distal end 115 of the ram 81 when the ram is extended as shown in FIG. 9, the ram is provided with a wheel support 116. As can be seen especially in FIGS. 9, 12 and 16, this wheel 116 is positioned to engage and roll over a wheel way 117 which is mounted upon a bracket 118 located between the stationary base 77 and the base 79 of the machine tool 24 which supports the turntable 40. The top of the ram assembly 81 is provided with slideways 120, 121 adapted to directly support the pallet 22 (FIG. 7).

THE LATCH

A reciprocable latch device 85 is provided to draw the pallet 22 onto the ram 81 and over the slideways 120, 121. As illustrated particularly in FIGS. 7 and 9, this latch 85 can be moved translatably along and between the ways 120, 121 of the ram 81. Here, the reciprocating latch motion is caused by a ball screw 125 which can be rotated through appropriate gearing 126 by a hydraulic motor 127 or other means. When the ball screw 125 is rotated, the latch mechanism 85, inhibited from rotation by the ways 120 and 121, is urged along the ram 81.

Figure 11:
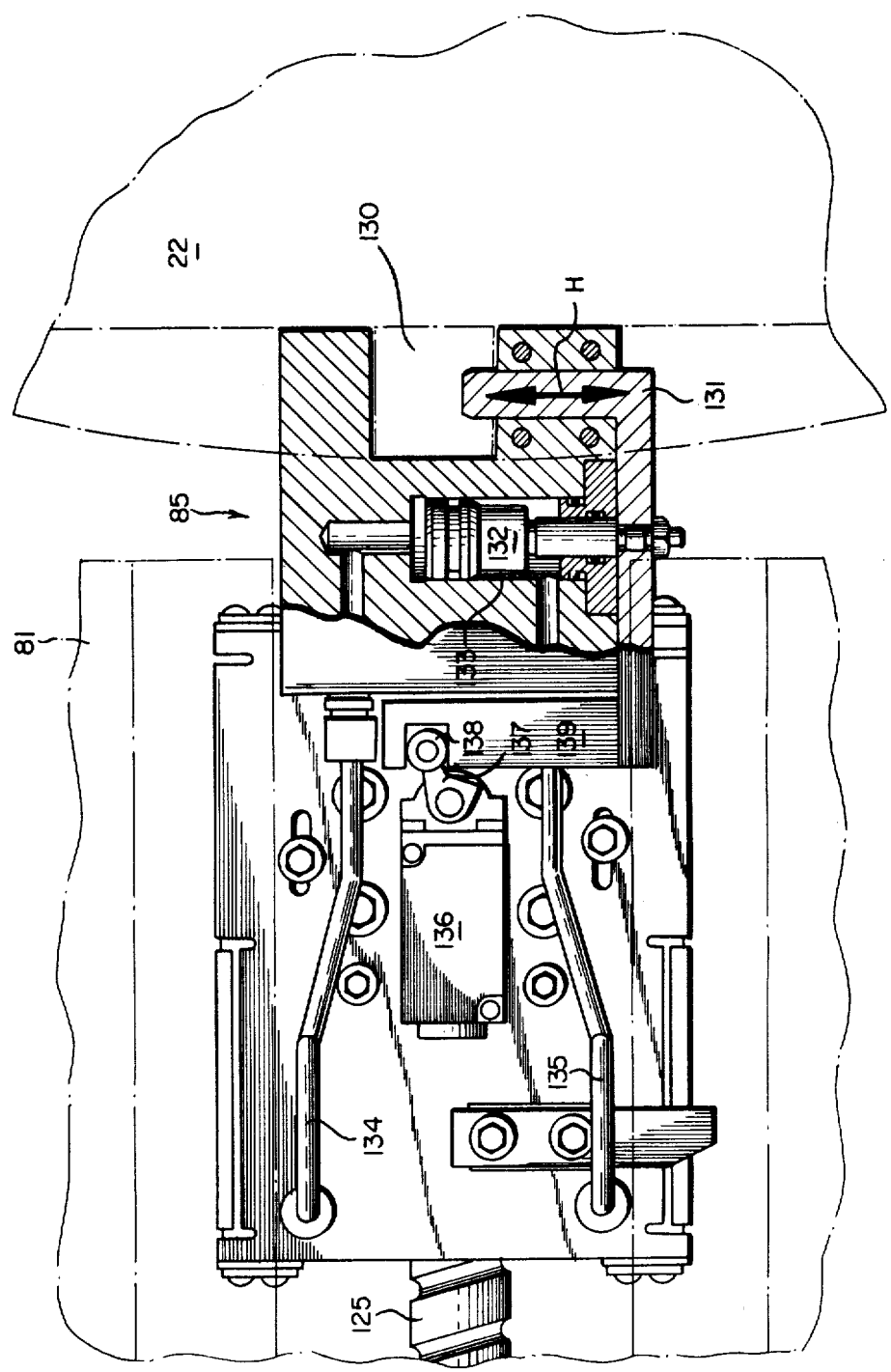
FIG. 11 is a top plan view in partial sectional aspect showing a typical pallet, a pallet-engaging latch and associated mechanism.

As illustrated particularly in FIG. 11, the latch mechanism 85 is designed to engage a hook formation 130 which is part of the pallet 22. Here, a latch hook pin 131 can be reciprocated by any suitable energizing mechanism such as a hydraulic piston 132 slidable within a mating hydraulic cylinder 133. When pressurized hydraulic fluid is supplied to the piston 132 through either of two hydraulic lines 134 or 135, the hook pin 131 is advanced or retracted as indicated by the arrow H. When the latch mechanism 85 is advanced, it engages the hook formation 130 of the pallet 22. Thereafter, when the ball screw 125 is rotated and the latch mechanism 85 is translatably moved—for example, to the left, in FIG. 9—the pallet 22 will be drawn along by the latch 85 over the ram 81 and ram ways 120, 121. A cam-operated switch 136 can be connected to suitable hydraulic valves (not shown) communicating with the hydraulic lines 134 and 135 which supply the latch cylinder 133 so as to energize the piston 132 in a direction calculated to move the latch hook 131 in a proper direction. The position of the latch hook 131 can be sensed through a rotatable cam arm 137 having a cam follower 138 mounted in a hook arm extension 139.

Figure 4:
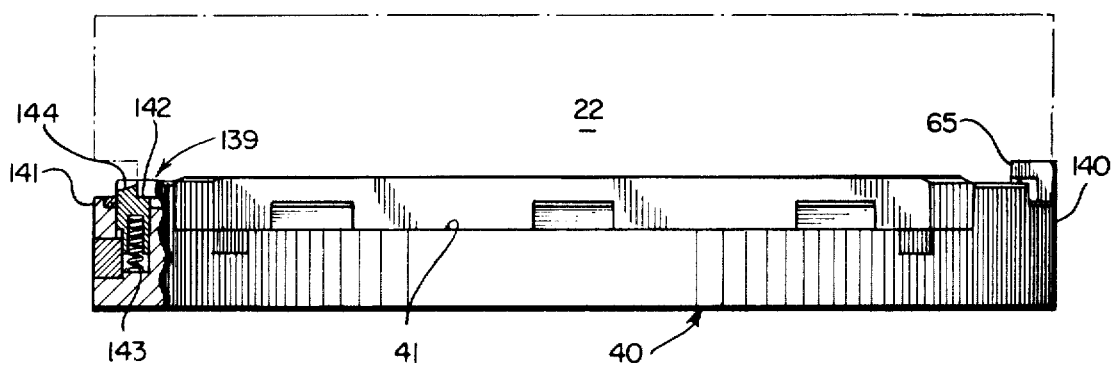
FIG. 4 is a side elevational view of the machine tool work table shown in FIG. 3 and showing, in phantom, a pallet associated with the machine tool table.

To positively retain the pallet 22 on the machine table 40, in accordance with the invention, a positive stop 65 and an automatic safety latch 139 can be mounted at opposite edges 140, 141 of the machine table 40, as shown in FIG. 4. In the illustrated embodiment, a latch catch member 142, biased upwardly as by a spring 143 (FIG. 4), is partly defined by a beveled edge 144. When the reciprocable latch 85 engages the pallet 22, this automatic safety table latch 139 is depressed, permitting the pallet 22 to be moved off the table 40 as described above. When the reciprocable latch 85 retracts from the table 40, the catch member 142 is returned to its upward operative position by the spring 143 to positively prevent the pallet 22 from sliding off the edge 141.

The positive stop 65 prevents the pallet 22 from sliding off edge 140.

OPERATION

A typical sequence of pallet transfer mechanism operations can be envisioned by serial reference to FIGS. 12-16, inclusive.

Figure 12:
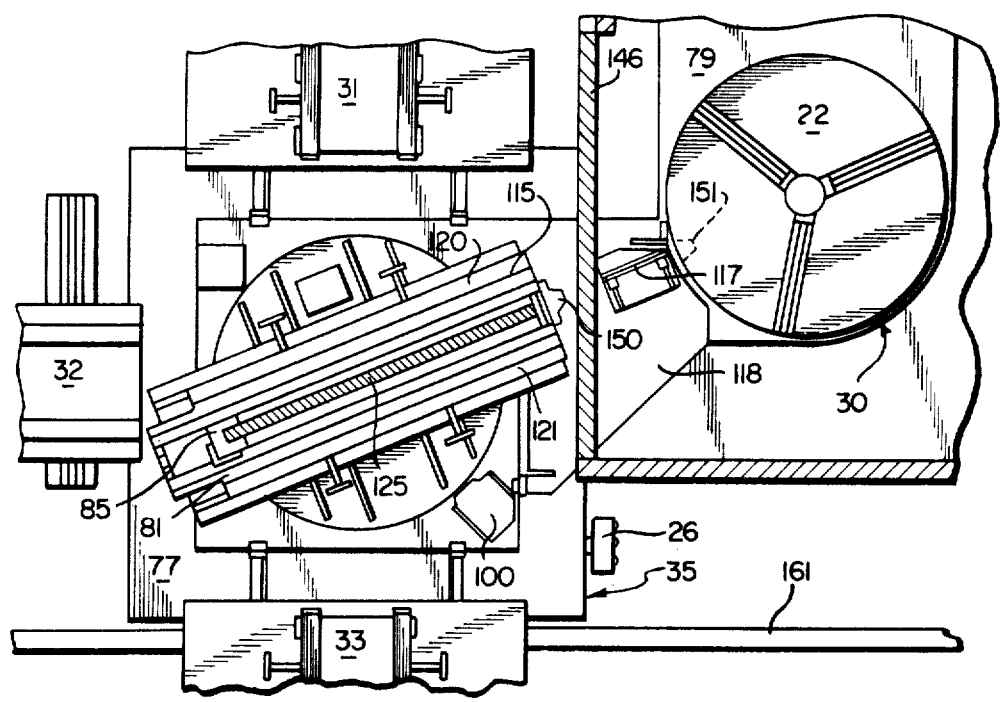
FIG. 12 is a top plan view showing, in somewhat schematic nature, the pallet transfer system as it appears when a pallet is located on a machine tool table.

As shown in FIG. 12, a pallet 22 can be located on a machine tool table which is rotatably carried atop the base 79 of a machine tool. Initially, a chip shield door 146 is closed. To transfer the pallet 22 to another station, the centralized pallet stand 35 is first operated to pivot the ram 81 into general alignment with the station 30 and pallet 22 as shown in FIG. 12. The machine table 40 is also generally aligned with the ram 81 by a resolver control or other suitable mechanism. The shot pin mechanism 100 is then energized to cause the male Vee 101 to engage an appropriate female Vee 102 so as to rotate the slideways base 80 slightly into final alignment with the work station 30. The chip shield door 146 is withdrawn by suitable control and power devices, operated through the control panel 26 and safety logic circuitry. The ram 81 is then extended over the rotary base slideways 105 by appropriate actuation of the hydraulic cylinder 106 (FIG. 9). When the ram 81 extends, the distal ram end wheel 116 engages and follows the wheel way 117, as also shown in FIG. 9.

Figure 10:
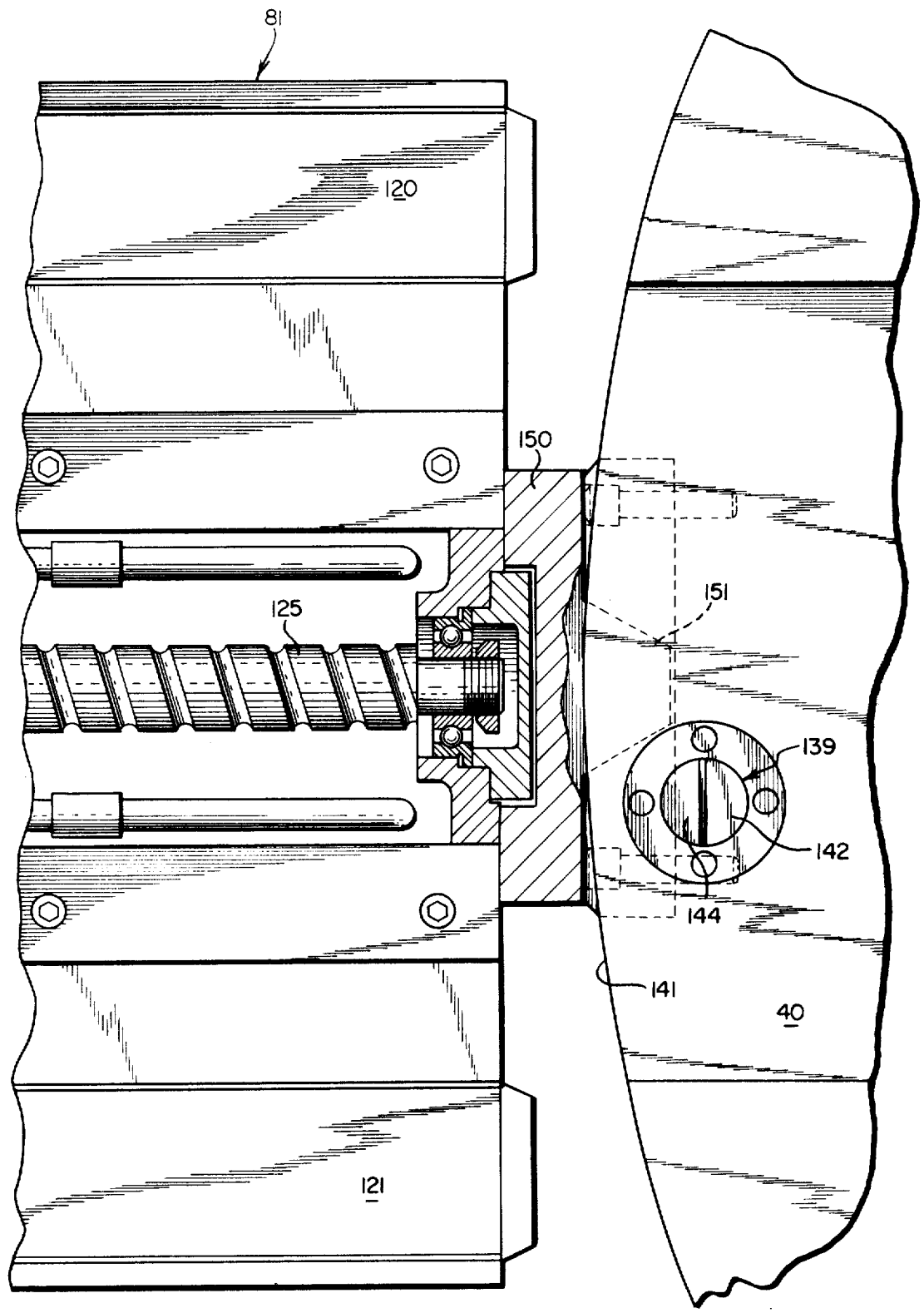
FIG. 10 is a fragmentary top plan view showing the pallet transfer ram and an associated machine tool table as they appear when the ram is advanced to the table for pallet transfer.
Figure 13:
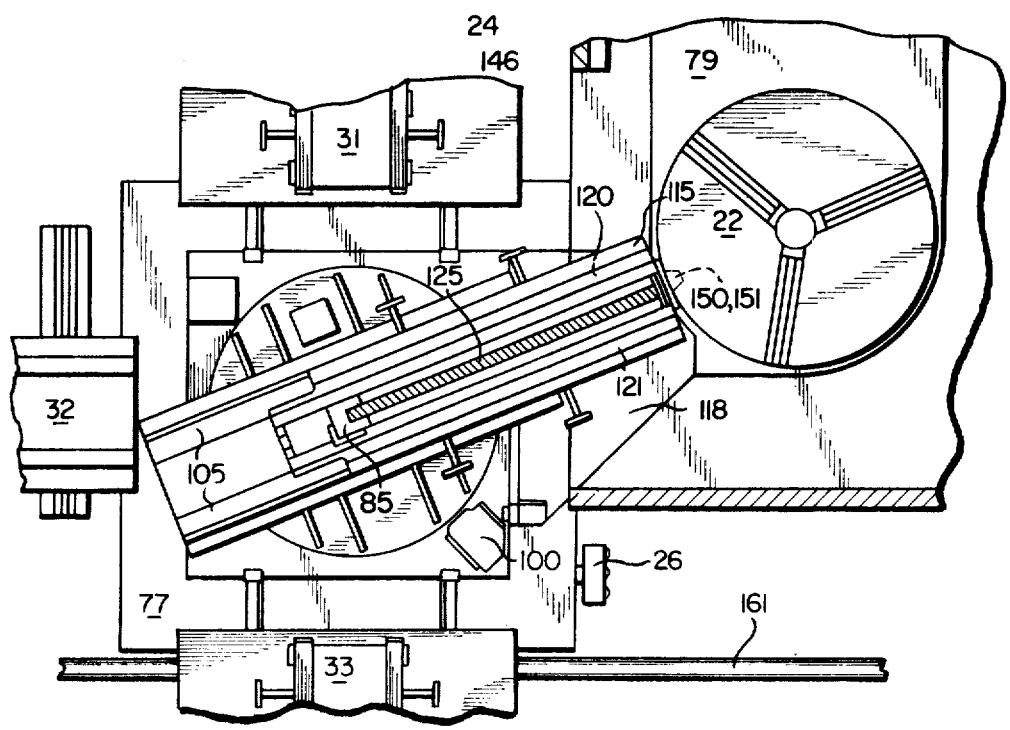
FIG. 13 is a top plan view similar to FIG. 12 but showing the system as it appears when the machine tool table has been engaged by the ram of the pallet transfer system.

It will be noted that, at the distal end 115 of the ram 81, a Vee member 150 is positioned to engage a mating notch 151 located in the machine table 40 which underlies the pallet 22 (FIGS. 10 and 13). When the Vee 150 engages this notch 151, the machine table 40 angularly moves slightly so as to permit the rails of the pallet 22 to slide smoothly and easily between the ways of the machine table 40 and the ram 81. This angular aligning movement of the table 40 can be accommodated by shifting the table drive mechanism (not shown) into a neutral position or mode.

Figure 14:
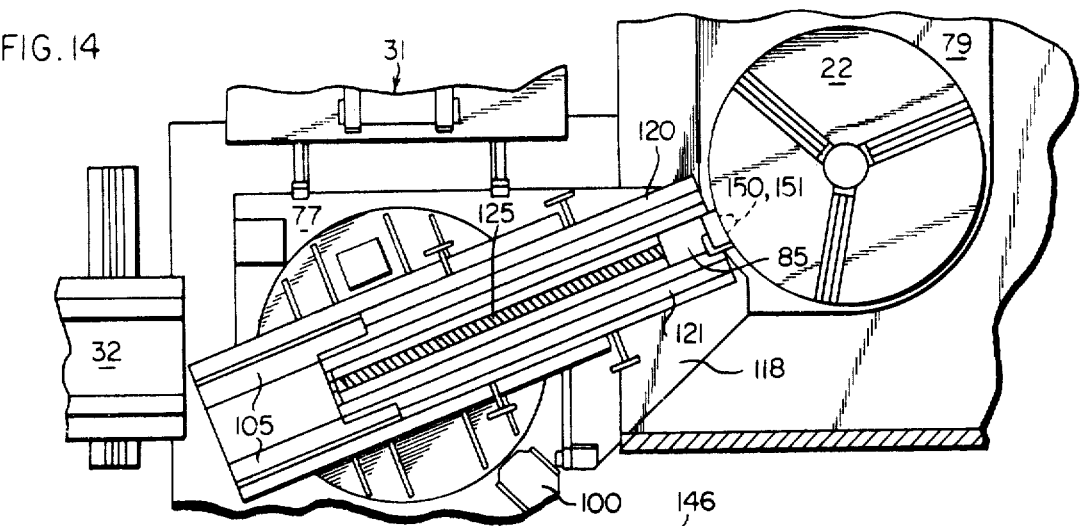
FIG. 14 is a top plan view similar to FIGS. 12 and 13 and showing the pallet as it appears when it has been engaged for transfer away from the machine tool.
Figure 15:
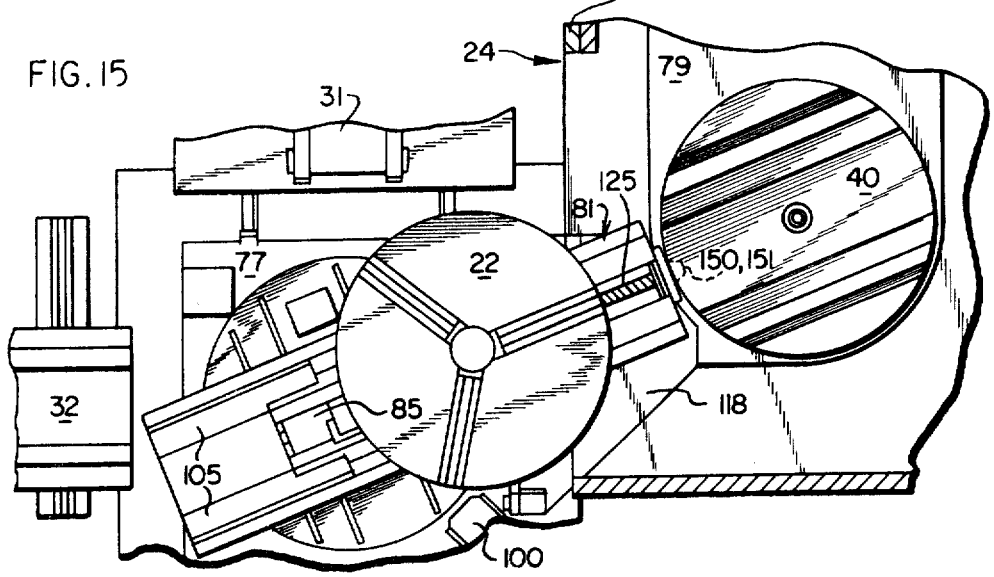
FIG. 15 is a top plan view somewhat similar to FIGS. 12-14 but showing the pallet when it has been moved from the machine tool toward the pallet transfer stand.

After the pallet transfer mechanism has reached the relative condition indicated in FIG. 13, the latch mechanism 85 is advanced to the front or distal end 115 of the ram 81 as indicated in FIG. 14. The latch mechanism 85 is then actuated, in the manner explained above, to engage the pallet 22. Thereafter, rotation of the ball screw 125 operates to draw the latch 85 and the engaged pallet 22 from the machine table 40 and onto the ram 81, as indicated in FIG. 15.

Figure 16:
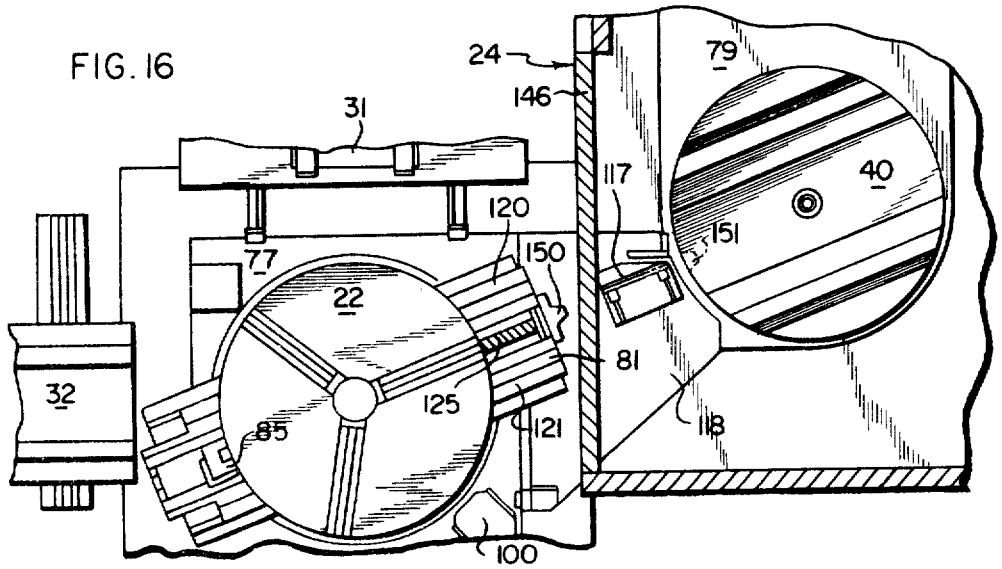
FIG. 16 is a top plan view somewhat similar to FIGS. 12-15 but showing the pallet as it appears when it has been moved fully onto the pallet transfer stand.

When the pallet 22 has been fully drawn upon the ram 81, the ram 81 is withdrawn upon the slideways base 80, as indicated in FIG. 16, and the machine tool chip shield 146 is returned to a closed position. Thereafter, the ram base 80, ram 81, and carried pallet 22 can be rotated or angularly indexed so as to point the ram 81 at another station. The ram 81 can then be extended to engage that station, and the latch mechanism operated so as to push the pallet 22 and any carried workpiece off the ram and onto that other work station. In accordance with the inherent flexibility of this invention, if a station is positioned close enough to the pallet stand 35, it is not necessary to extend the ram, but merely the latch 85, to effect the transfer of work-carrying pallets.

The other work station can be the work station 32 associated with the horizontal boring machine 25. Alternatively, the pallet 22 can be delivered to a storage station 31 which is not associated with any machine tool. This permits the system 20 to handle several pallets during a single cycle of operations. Great flexibility in the use of the system 20 can thus be obtained, in furtherance of the invention.

Figure 6:
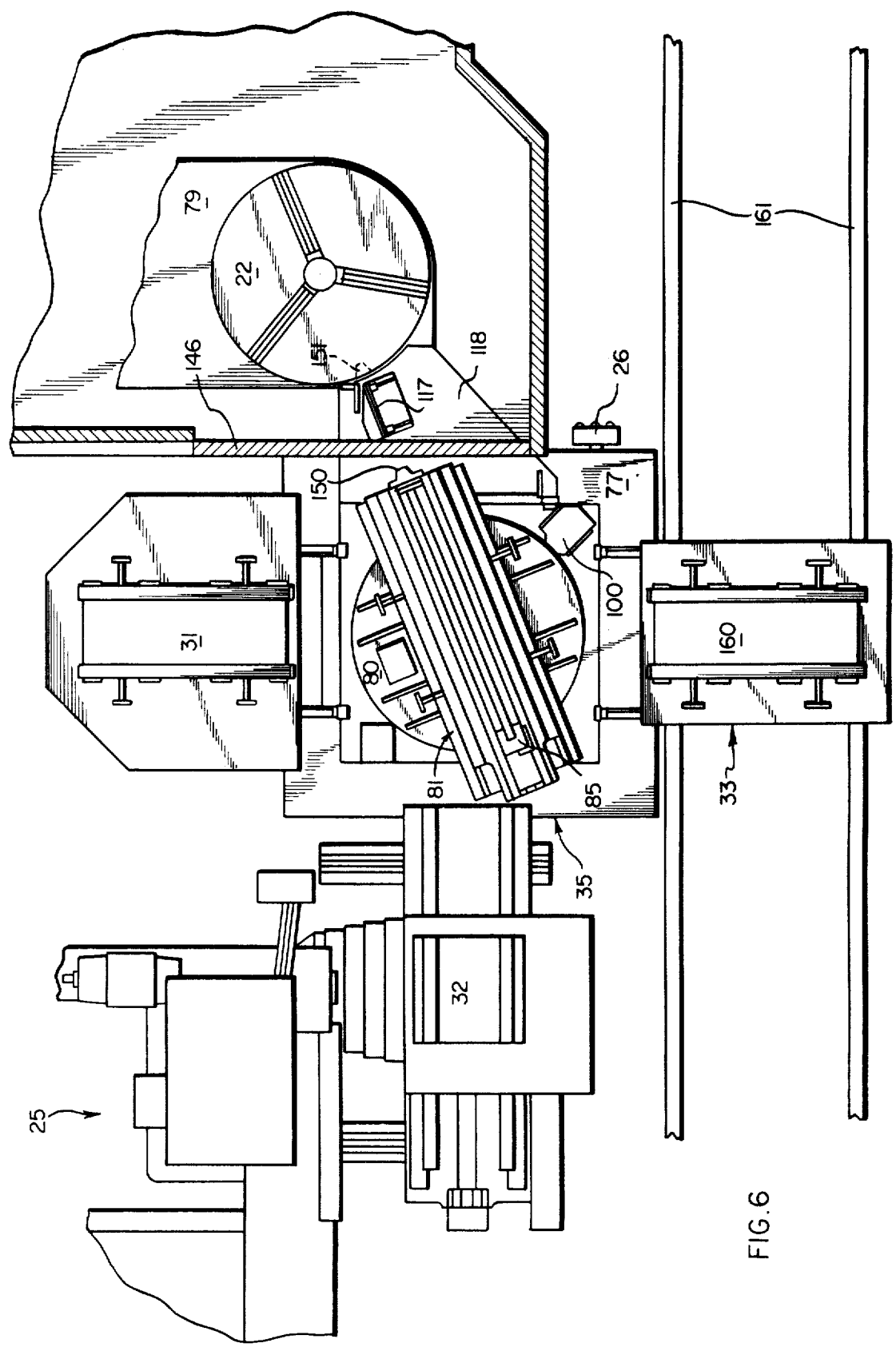
FIG. 6 is a top plan view of the novel system and associated machine tools shown in FIGS. 1 and 2 and showing, in section, several chip shields associated with one of the machine tools.

Alternatively, the pallet 22 can be transferred to a cart 160 which has been located at an access position 33. This position 33 is, as illustrated in FIGS. 1 and 6, within the reach or range of motions of the pallet stand 35. In this way, a pallet 22 can be placed on or taken from the cart 160. The cart 160 can be moved to and from the transfer station 33 along rails 161 which lead to other portions of the factory.

The invention is claimed as follows:

1. A workpiece handling system for transferring workpieces between a number of stations, each station having a pallet receiving device, the system comprising the combination of a stand having a rotatable slideways base, a slideways ram carried for reciprocation on the slideways base and adapted to receive workpiece-carrying pallets, a latch means carried for reciprocation on the ram for engaging the pallet and drawing the pallet over the ram, and alignment means for aligning a pallet receiving device located at a station with the ram, the alignment means including male alignment means having at least one beveled surface and carried on one of the ram and pallet receiving devices, and female alignment receiving means having surfaces matable with the male alignment means and carried on the other of the ram and pallet receiving device for receivably engaging the male alignment device.

2. A workpiece handling system according to claim 1 wherein said means for aligning the ram with a pallet receiving device includes male alignment means having at least one beveled surface and carried on a station foundation, and female alignment receiving means having surfaces matable with the male alignment means and carried on the rotatable slideways base for receivably engaging the male alignment device.

3. A workpiece handling system according to claim 1 including cart means having a pallet receiving device and being adapted to be positioned at a station to transfer a pallet between the cart-mounted pallet receiving device and the slideways ram.

4. A workpiece handling system according to claim 1 including ball screw means carried by the slideways ram for reciprocably moving said latch means on the slideways ram.

5. A workpiece handling system according to claim 1 including support wing means affixed in position outboard of said slideways ram and adapted to inhibit pallet tipping action.

6. A workpiece handling system according to claim 1 including support wheel means mounted at a distal end of said slideways ram for providing additional support to the distal end of said slideways ram when the slideways ram is located in an extended position.

7. A workpiece handling system according to claim 1 including a plurality of pallet receiving devices, and safety latch means on the pallet receiving devices for preventing the unintended loss of a pallet from the pallet receiving devices.

8. A workpiece handling system according to claim 1 including means for permitting said slideways base to be rotated in a horizontal plane through substantially 360° of rotation over said stand.

9. A workpiece handling system according to claim 1 including drive means for rotating said slideways base.

10. A workpiece handling system according to claim 9 wherein said drive means includes motor means and lost motion means interposed between the motor means and said rotatable slideways base to accommodate slight angular alignment motion at the slideways base without damaging the motor means.

11. A workpiece handling system for transferring palletized workpieces between three or more stations, the system comprising pallet-accepting slideways means, translator means for moving a pallet over the slideways means radially toward and away from a center point through a range of positions, rotator means for moving the slideways means angularly about the center point through a range of positions, and at least three stations within the ranges of movement of the slideways means and adapted to accept pallets from the slideways means, the translator means including ram means mounting said slideways means and being reciprocable upon said rotator means, and latch means reciprocable on the ram means for moving a pallet over the ram-mounted slideways means, at least one of said stations including a pallet receiving device and safety latch means for preventing unintended movement of a pallet off the pallet receiving device during machining operations.

12. A workpiece handling system according to claim 11 wherein at least one of said stations includes a work table associated with a vertical turret lathe.

13. A workpiece handling system according to claim 11 wherein at least one of said stations includes a work table associated with a horizontal boring machine.

14. A workpiece handling system according to claim 11 wherein at least one station comprises a storage station.

15. A workpiece handling system according to claim 11 wherein at least one station comprises movable cart means movable toward and away from a position of alignment with the slideways means.

16. A workpiece handling system according to claim 11 wherein said translator means includes translatably-movable latch means reciprocable on the slideways means for moving a pallet over the slideways means.

17. A workpiece handling system according to claim 11 wherein said translator means includes a ram translatably movable in a radial direction toward and away from the center point.

18. A workpiece handling system according to claim 11 including translator alignment means for aligning the slideways means with any of said stations so as to permit the unimpeded transfer of a pallet between said station and said pallet-accepting slideways means.

19. A workpiece handling system according to claim 11 including work station alignment means for angularly aligning at least one work station mechanism with said slideways means.

20. A workpiece handling system for transferring palletized workpieces between various pallet receiving stations, the system comprising the combination of a slideways means mounted for rotation in a horizontal plane, latch means reciprocably carried over the slideways means, ball screw means for effecting reciprocable motion of said latch means, and alignment means for aligning the rotatable slideways means with one of a plurality of pallet receiving stations for effecting a smooth transfer of the pallet between the slideways means and the pallet receiving station, said pallet receiving stations including the work tables of a plurality of machine tools.

21. A workpiece handling system according to claim 20 wherein said system includes at least one pallet receiving station which is associated with a machine tool and which is adapted to receive pallets from and present pallets to the slideways means.

22. A workpiece handling system according to claim 21 wherein said pallet receiving stations include a work table associated with a vertical turret lathe.

23. A workpiece handling system according to claim 21 wherein said pallet receiving stations include a work table associated with a horizontal boring machine.

24. A workpiece handling system according to claim 20 including cart means adapted to carry a pallet to and from a position adjacent said slideways means at which said latch means can engage a pallet carried by the cart.

25. A workpiece handling system according to claim 20 wherein said pallet receiving stations include a pallet storage area.

26. A workpiece handling system according to claim 20 wherein said slideways means includes a base means mounted for rotation through substantially 360° in a horizontal plane, and a ram means translatably slidable over said base means.

27. A workpiece handling system according to claim 26 including support wing means mounted outboard of said ram means to inhibit pallet tipping action.

28. A workpiece handling system according to claim 26 including wheel support means carried at a distal end of said ram means for supporting the ram means when the ram means is extended from the rotatable base.

29. A workpiece handling system according to claim 28 including wheel way means mounted adjacent the pallet receiving station for engaging and supporting said wheel support means.

30. A workpiece handling system according to claim 20 wherein said means for aligning the rotatable slideways means with a pallet receiving station includes reciprocable shot pin means for engaging a portion of the rotary slideways means and aligning the slideways means with the pallet receiving station.

31. A workpiece handling system according to claim 20 wherein said stations include at least one pallet receiving device, and wherein safety latch means are located at the pallet receiving station for preventing movement of a pallet over the ends of said pallet receiving device during machine operations.

32. A workpiece handling system according to claim 20 wherein said workpiece handling system is associated with a machine tool having movable chip shields, the workpiece handling system including switch means operatively interposed between said alignment means and the machine tool chip shields for moving the machine tool chip shields when the slideways means is aligned with an associated pallet receiving station to permit transfer of a pallet between the pallet receiving station and the slideways means without interference by the chip shields.

33. A method of handling a workpiece-mounting pallet located at a machine tool work station comprising the steps of withdrawing a chip shield at the machine tool, translatably advancing a ram toward the machine tool and pallet, using a shot pin means to precisely angularly align the ram with the work station, translatably advancing a latch over the ram, causing the latch to engage the pallet, retracting the latch and engaged pallet over the ram so as to locate the pallet on the ram, withdrawing the ram from the machine tool, and angularly indexing the ram and carried pallet to align the ram with another work station to which the pallet is to be delivered.

34. A method according to claim 33 including the step of relocating the chip shield in its original position at the machine tool after the ram has been withdrawn from the machine tool.

35. A method according to claim 33 including the additional step of precisely angularly aligning a portion of the work station with the advanced ram so as to permit the unimpeded transfer of the pallet from the work station to the ram.

36. In combination, a workpiece handling system and a plurality of machine tools, wherein there is provided a plurality of pallet receiving stations, at least one of which is the work station of each of the machine tools, the workpiece handling system comprising slideways means mounted for rotation through substantially 360° in a horizontal plane, latch means reciprocably carried over the slideways means for engaging a pallet and drawing the pallet over the slideways means, and alignment means for selectively aligning the rotatable slideways means with each of said pallet receiving stations for effecting a smooth transfer of the pallet between the slideways means and the pallet receiving station with which the slideways means is then aligned.

37. The combination according to claim 36 wherein said at least one machine tool is a vertical turret lathe.

38. The combination according to claim 36 wherein said at least one machine tool is a horizontal boring machine.

39. The combination according to claim 36 wherein at least one of said pallet receiving stations is a pallet storage stand.

40. The combination according to either of claims 36 or 39 wherein at least one of said pallet receiving stations is a cart adapted to carry a pallet and associated workpiece to and from a position adjacent said slideways means for engagement by said latch means.

41. The combination according to claim 36 wherein said slideways means includes base means mounted for rotation in a horizontal plane, and ram means translationally slidable over said base means and including pallet accepting slideways, with said latch means reciprocably carried by said ram means.

42. A workpiece handling system for transferring workpieces among several machine tools such as a vertical turret lathe and a horizontal boring machine, and a storage station, the system comprising the combination of a stand having a slideways base rotatable over the stand through substantially 360° of rotation, a slideways ram carried for reciprocation on the slideways base and adapted to receive workpiece carrying pallets, and a latch means carried for reciprocation on the slideways ram for engaging a pallet and drawing the pallet over the ram.

43. A workpiece handling system according to claim 42 including alignment means for aligning the slideways ram with a pallet-receiving device located at a station so as to effect transfer of the pallet between the ram and the pallet receiving device, the alignment means including male alignment means having at least one beveled surface and carried on one of the ram and pallet receiving devices, and complimentary female alignment means having at least one beveled surface matable with the male alignment means and carried on the other of the pallet receiving devices and ram for receivingly engaging the male alignment device.

44. A workpiece handling system for transferring workpieces between a plurality of work stations, the system comprising the combination of a stand having a rotatable slideways base, a slideways ram carried for reciprocation on the slideways base and adapted to receive workpiece-carrying pallets, latch means carried for reciprocation on the ram for engaging a pallet and drawing the pallet over the ram, male alignment means having at least one beveled surface and carried on one of the ram and workpiece stations, and complimentary female alignment means having surfaces matable with the alignment means and carried on the other of the workpiece stations and ram for receivably engaging the male alignment means.

45. A workpiece handling system for transferring workpieces between a number of stations, the system comprising the combination of a stand having a slideways base rotatable relative to the stand through substantially 360°, a slideways ram carried for reciprocation on the slideways base and adapted to receive workpiece carrying pallets, latch means carried for reciprocation on the ram for engaging the pallet and drawing the pallet over the ram, and safety latch means on the workpiece stations for preventing the unintended loss of a pallet from the workpiece receiving stations.

* * * * *